(12) United States Patent
Hwang et al.

(10) Patent No.: US 7,258,907 B2
(45) Date of Patent: Aug. 21, 2007

(54) OPTICAL DISK

(75) Inventors: Hyo-Kune Hwang, Gyeonggi-Do (KR); Byung-Ju Dan, Gyeonggi-Do (KR); Jong-Man Kim, Seoul (KR); Nam-Woong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 68 days.

(21) Appl. No.: 10/918,050

(22) Filed: Aug. 13, 2004

(65) Prior Publication Data

US 2005/0041569 A1  Feb. 24, 2005

(30) Foreign Application Priority Data

Aug. 20, 2003  (KR)  .................. 10-2003-0057599

(51) Int. Cl.
*B32B 3/02* (2006.01)

(52) U.S. Cl. ................................. 428/64.4; 430/270.11
(58) Field of Classification Search ............... 428/64.4; 430/270.11

See application file for complete search history.

(56) References Cited

U.S. PATENT DOCUMENTS 5,987,004 A * 11/1999 Suwabe ...................... 720/723
6,214,430 B1 * 4/2001 Kim et al. ................. 428/64.1
2002/0029256 A1    3/2002 Zintel et al.

FOREIGN PATENT DOCUMENTS

JP           63292475     * 11/1988
WO      WO 02/05118 A2     1/2002

OTHER PUBLICATIONS

XP-002210614, Jun. 8, 2002.

* cited by examiner

*Primary Examiner*—Bruce H. Hess
(74) *Attorney, Agent, or Firm*—Lee, Hong, Degerman, Kang & Schmadeka

(57) ABSTRACT

The present invention discloses an optical disk formed according to double injection molding of forming an area of the optical disk on which a recording film is formed, namely, an outer circumferential area by using polycarbonate that is an amorphous polymer, and forming an area of the optical disk on which the recording film is not formed, namely, an inner circumferential area by using a semi-crystalline polymer having a similar elastic modulus to that of polycarbonate and having durability to a static fatigue, especially polyamide. Therefore, the optical disk is efficiently prevented from being damaged by restricting growth of cracks near its hole, obtaining excellent optical characteristics as an information recording medium.

15 Claims, 2 Drawing Sheets

OPTICAL DISK

BACKGROUND OF THE INVENTION

1. Field of the Invention

The present invention relates to an optical disk, and more particularly to, an optical disk which can be efficiently prevented from being damaged, by forming an inner circumferential area of the optical disk by using a semi-crystalline polymer.

2. Description of the Related Art

In general, an optical disk is classified into a compact disk for recording data such as voice or image signals according to a digital recording method, and a digital versatile disk using a short wavelength of red semiconductor laser and having a large recording capacity.

FIG. 1 is a plane view illustrating a general optical disk.

Referring to FIG. 1, a hole 10a is formed at the center of the optical disk 10, an inner circumferential area 11 on which a recording film is not formed is formed on the outer circumferential surface of the hole 10a, and an outer circumferential area 12 is formed on the outer circumferential surface of the inner circumferential area 11.

Normally, the optical disk 10 is cracked through carelessness of the user, or when the optical disk 10 is composed of polycarbonate that is an amorphous polymer.

Even if only 1/10 of yield stress is continuously applied to polycarbonate that is the amorphous polymer at the normal temperature, polycarbonate is damaged.

The optical disk 10 may be damaged as follows. When the optical disk 10 is injection-molded or handled by the user, minute scratches formed around the hole 10a of the optical disk 10 cause cracks. Such cracks are gradually grown by a craze phenomenon, to damage the optical disk 10.

According to the craze phenomenon, a chain structure inside the amorphous polymer is collapsed and cut, and cracks are gradually grown, thereby finally damaging the optical disk 10.

In addition, an optical disk drive over 10,000 rpm, namely, 52x has been normally used. In the case of 52x, as shown in FIG. 2, a maximum yield stress of the optical disk 10 reaches 4.315 MPa.

In the 52x optical disk drive, if the optical disk 10 is damaged, a maximum speed of fragments reaches 66 m/s. That is, the fragments of the optical disk 10 may injure the user through a front surface of a casing of the optical disk drive.

The optical disk 10 is damaged because its material, polycarbonate is the amorphous polymer. Here, the optical disk 10 is damaged due to a static fatigue (or static load) at the normal temperature.

In order to prevent the optical disk 10 from being damaged, a crystalline polymer or a semi-crystalline polymer such as a thermosetting resin must be used to form the optical disk 10. However, the crystalline polymer or the semi-crystalline polymer has inferior optical characteristics. Technically, the crystalline polymer or the semi-crystalline polymer cannot be employed as the basic material of the optical disk 10.

That is to say, polycarbonate that is the amorphous polymer has been used to form the optical disk 10 to improve optical characteristics. However, polycarbonate is easily cracked due to the static fatigue, and such cracks are grown to damage the optical disk 10.

A method for preventing an optical disk from being damaged has been disclosed under Korean Laid-Open Patent Application 2001-0091302.

According to Korean Laid-Open Patent Application 2001-0091302, a metal material is molded in or inserted into the inner circumferential surface of the optical disk. However, an elastic modulus of the metal material is much higher than that of polycarbonate. As a result, a very high stress, about 52.5 MPa of stress is concentrated around the metal material, and thus the optical disk is more easily damaged than the general optical disk.

SUMMARY OF THE INVENTION

Therefore, an object of the present invention is to provide an optical disk which can be efficiently prevented from being damaged according to double injection molding of forming an area of the optical disk on which a recording film is formed, namely, an outer circumferential area by using polycarbonate that is an amorphous polymer, and forming an area of the optical disk on which the recording film is not formed, namely, an inner circumferential area by using polyamide that is a semi-crystalline polymer having a similar elastic modulus to that of polycarbonate and having durability to a static fatigue.

To achieve these and other advantages and in accordance with the purpose of the present invention, as embodied and broadly described herein, there is provided an optical disk including an outer circumferential area on which a recording film for recording and reproducing data is formed, and an inner circumferential area which is formed inside the outer circumferential area and which the recording film is not formed on, wherein the outer circumferential area is composed of an amorphous polymer, and the inner circumferential area is composed of a semi-crystalline polymer.

The semi-crystalline polymer is polyamide that is a polymer prepared by bonding CONH between amides.

Polyamide is one of nylon 66 that is a condensation polymer of hexamethylene diamine and adipic acid, and nylon 6 that is a polymer of ε-caprolactam.

The semi-crystalline polymer is aramid (aromatic synthetic polyamide) prepared by bonding benzene between amides.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Before the descriptions of the present invention, conditions that must be considered to efficiently prevent an optical disk from being damaged will now be explained.

First, a material of an inner circumferential area of the optical disk must have a similar elastic modulus to that of polycarbonate of an outer circumferential area of the optical disk.

Both the inner and outer circumferential areas receive an outward force by the centrifugal force applied to the optical disk during 52x revolutions of the optical disk. If the elastic modulus of the material of the inner circumferential area is very different from that of the material of the outer circumferential area, a stress is concentrated on the junction between the inner and outer circumferential areas due to different elastic moduli, to cause a craze phenomenon.

Second, the optical disk must be composed of a crystalline polymer or a semi-crystalline polymer having durability to a static fatigue.

Third, the optical disk must have rigidity so that it can be protected from an external impact or load in transportation or maintenance.

In accordance with the present invention, the optical disk is efficiently prevented from being damaged in consideration of the foregoing conditions.

The optical disk in accordance with the preferred embodiment of the present invention will now be described in detail with reference to the accompanying drawings.

Figure 3:
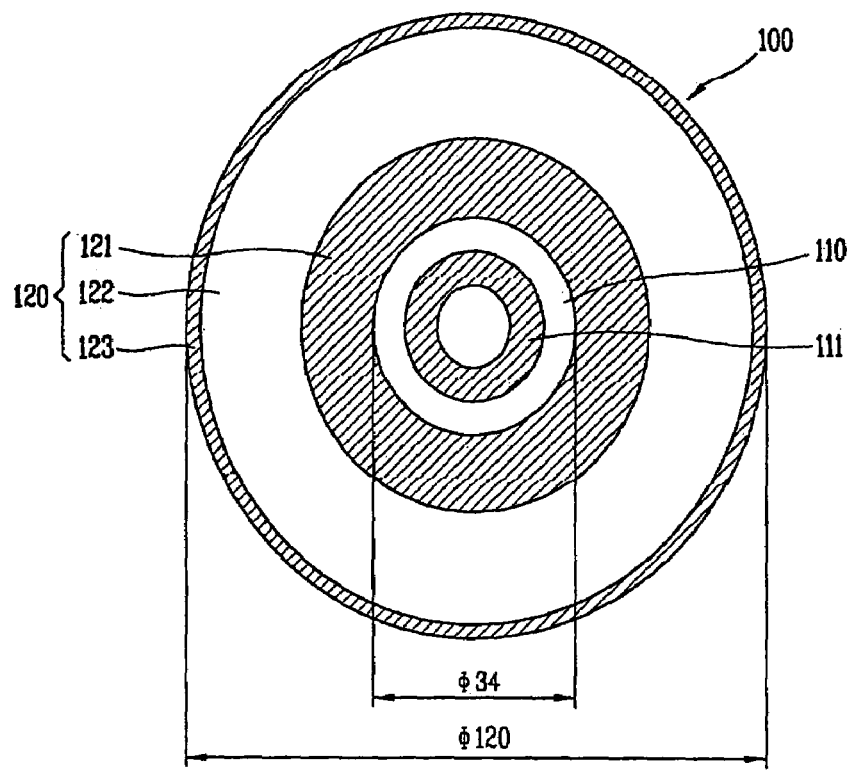
FIG. 3 is a plane view illustrating an optical disk in accordance with a preferred embodiment of the present invention.
Figure 4:
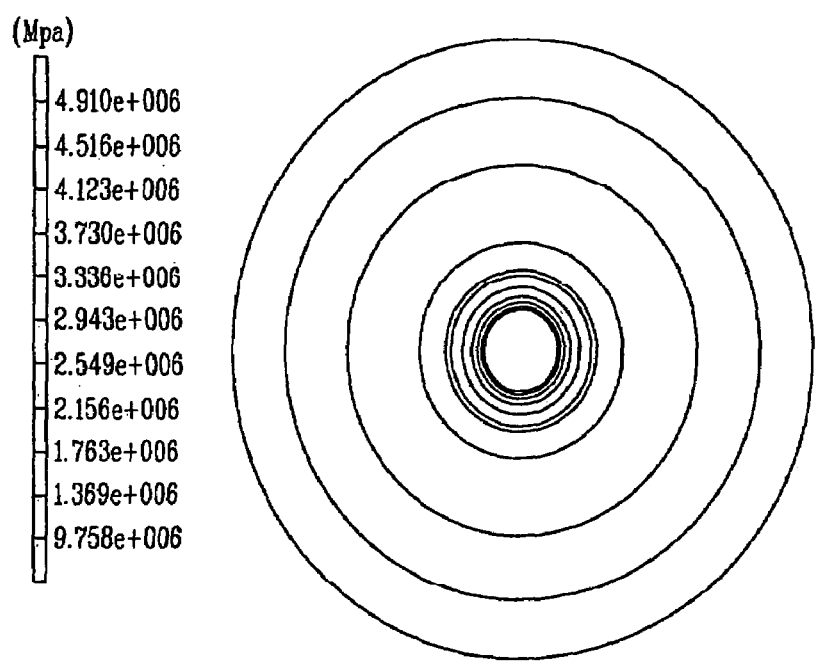
FIG. 4 is a plane view illustrating stress distribution of the optical disk in accordance with the preferred embodiment of the present invention.

FIG. 3 is a plane view illustrating the optical disk in accordance with the present invention, and FIG. 4 is a plane view illustrating stress distribution of the optical disk in accordance with the present invention.

As illustrated in FIG. 3, in the optical disk 100, an inner circumferential area 110 and an outer circumferential area 120 are incorporated by double injection. Differently from the inner and outer circumferential areas of the conventional optical disk, the outer circumferential area 120 of the optical disk 100 on which a recording film is formed is composed of an amorphous polymer, and the inner circumferential area 110 of the optical disk 100 on which the recording film is not formed is composed of a semi-crystalline polymer.

The outer circumferential area 120 is divided into a read-in area 121 for recording addresses of each data, a program area 122 for recording main data in the outer circumferential direction of the read-in area 121, and a read-out area 123 for displaying end of the data in the outermost end of the program area 122. The inner circumferential area 110 includes a clamping area 111.

In the clamping area 111, a clamp clamps the optical disk 100. The clamping area 111 is composed of a semi-crystalline polymer having durability to a static fatigue.

A polymer having an amide bond —CONH— as a main chain in molecules, for example, polyamide or aramid can be used as the semi-crystalline polymer.

Exemplary polyamide includes nylon 66 that is a condensation polymer of hexamethylene diamine and adipic acid, and nylon 6 that is a polymer of $\epsilon$-caprolactam.

Here, polyamide is a representative engineering plastic which is strong and excellent in impact resistance, chemical resistance and electrical properties. In addition, nylon 610, 11 and 12 are very flexible, elastic and excellent in oil resistance and hygroscopicity.

Aramid (aromatic synthetic polyamide) provided with an aromatic frame to improve heat resistance can also be used to form the inner circumferential area 110 of the optical disk 100.

Exemplary aramid includes Nomex (Dupont) containing phthalic acid chloride and metaphenylene diamine, and fiber Kevlar (Dupont) having high heat resistance and high elasticity.

In accordance with the present invention, the area of the optical disk 100 requiring excellent optical characteristics is between 34 mm and 120 mm in diameter of the optical disk 100. This area, namely, the outer circumferential area 120 is composed of polycarbonate that is an amorphous polymer, and the other area between 0 mm and 34 mm in diameter, namely, the inner circumferential area 110 is composed of a semi-crystalline polymer, especially polyamide. That is, the optical disk 100 is double injection-molded. Therefore, the optical disk 100 is not cracked in 52x. Even if the optical disk 100 is cracked, it is efficiently prevented from being damaged due to the static fatigue, differently from the conventional optical disk.

The inner circumferential area 110 of the optical disk 100 can be composed of a crystalline polymer. Preferably, the inner circumferential area 110 is composed of a semi-crystalline polymer which is not that different in elastic modulus and yield stress from the amorphous polymer of the outer circumferential area 120, and which efficiently prevents crack growth.

Table 1 shows elastic moduli and stresses of each material.

TABLE 1

| Material | Thermal expansion coefficient [/° C.] | Elastic modulus [MPa] | Yield stress [MPa] |
|---|---|---|---|
| Polycarbonate | 1.22 E–04 | 2,400 | 62 |
| Polyamide | 1.34 E–04 | 2,800 | 82.7 |
| Steel | 1.17 E–05 | 200,000 | 250 |
| Aluminum | 2.36 E–05 | 70,000 | 260 |

As shown in Table 1, differently from steel and aluminum, polyamide is a semi-crystalline polymer, and slightly different in elastic modulus and yield stress from polycarbonate that is the base material of the optical disk 100.

In the case that the inner circumferential area 110 of the optical disk 100 is composed of polyamide, crack growth is restricted therein. Accordingly, the optical disk 100 is efficiently prevented from being damaged.

Figure 1:
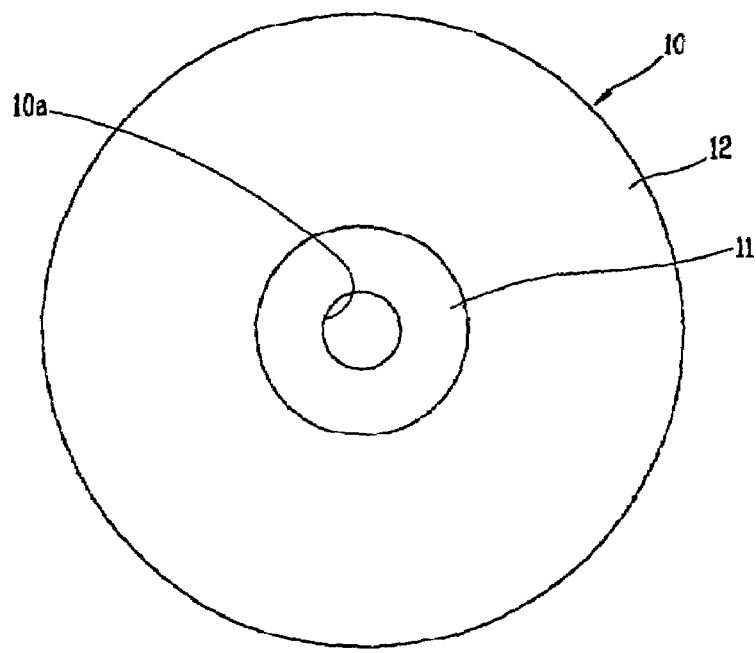
FIG. 1 is a plane view illustrating a conventional optical disk.
Figure 2:
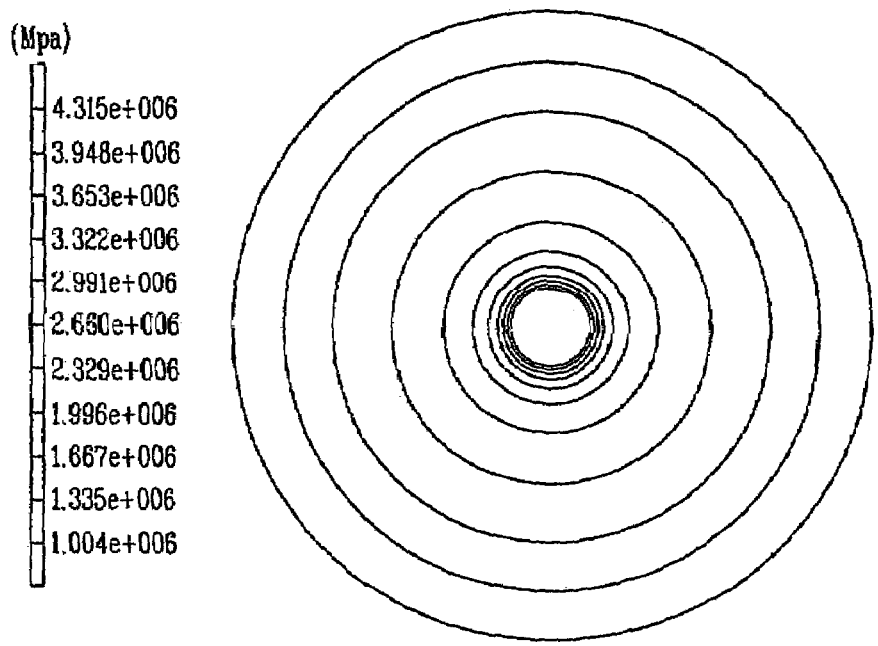
FIG. 2 is a plane view illustrating stress distribution of the conventional optical disk.

That is, as depicted in FIG. 4, a maximum yield stress of the optical disk 100 is 4.910 MPa, and as depicted in FIG. 2, a maximum yield stress of the conventional optical disk is 4.315 MPa.

Although not illustrated, a maximum J integral value of the optical disk 100 is 50 N/m, and a maximum J integral value of the conventional optical disk is 56 N/m.

For reference, the J integral value shows crack sensitivity of the optical disk. The smaller the J integral value is, the lower crack sensitivity is.

The maximum yield stress of the optical disk 100 is higher than that of the conventional optical disk by 13.8%, but the maximum J integral value of the optical disk 100 is lower than that of the conventional optical disk by 11%.

Accordingly, the crack sensitivity of the optical disk 100 is relatively lower than that of the conventional optical disk, so that cracks caused in the transportation or mounting at the time of fabricating or using the optical disk 100 cannot be grown due to the static fatigue. As a result, the optical disk 100 is efficiently prevented from being damaged.

As discussed earlier, in accordance with the present invention, the optical disk is formed according to double injection molding of forming the area of the optical disk on which the recording film is formed, namely, the outer circumferential area by using polycarbonate that is the amorphous polymer, and forming the area of the optical disk on which the recording film is not formed, namely, the inner circumferential area by using polyamide that is the semi-crystalline polymer having the similar elastic modulus to that of polycarbonate and having durability to the static fatigue. Therefore, the optical disk is efficiently prevented from being damaged by restricting growth of cracks near its hole, obtaining excellent optical characteristics as an information recording medium.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An optical disk comprising an outer circumferential area on which a recording film for recording and reproducing data is formed, and an inner circumferential area which is formed inside the outer circumferential area and which the recording film is not formed on,
    wherein the outer circumferential area is composed of an amorphous polymer, and the inner circumferential area is composed of a semi-crystalline polymer.

2. The optical disk of claim 1, wherein the semi-crystalline polymer is a polymer prepared by bonding CONH between amides.

3. The optical disk of claim 1, wherein the semi-crystalline polymer is polyamide.

4. The optical disk of claim 3, wherein polyamide is one of nylon 66 that is a condensation polymer of hexamethylene diamine and adipic acid, and nylon 6 that is a polymer of $\epsilon$-caprolactam.

5. The optical disk of claim 1, wherein the semi-crystalline polymer is aramid (aromatic synthetic polyamide) prepared by bonding benzene between amides.

6. The optical disk of claim 5, wherein aramid contains phthalic acid chloride and metaphenylene diamine.

7. The optical disk of claim 1, wherein the amorphous polymer is polycarbonate.

8. The optical disk of claim 1, wherein polyamide is one of nylon 66 that is a condensation polymer of hexamethylene diamine and adipic acid, and nylon 6 that is a polymer of $\epsilon$-caprolactam.

9. An optical disk comprising a clamping area, a read-in area for recording addresses of each data in the outer circumferential direction of the claming area, a program area for recording main data in the outer circumferential direction of the read-in area, and a read-out area for displaying end of the data in the outermost end of the program area,
    wherein the read-in area and the read-out area are composed of an amorphous polymer, and the clamping area is composed of a semi-crystalline polymer.

10. The optical disk of claim 9, wherein the semi-crystalline polymer is a polymer prepared by bonding CONH between amides.

11. The optical disk of claim 9, wherein the semi-crystalline polymer is polyamide.

12. The optical disk of claim 11, wherein polyamide is one of nylon 66 that is a condensation polymer of hexamethylene diamine and adipic acid, and nylon 6 that is a polymer of $\epsilon$-caprolactam.

13. The optical disk of claim 10, wherein the semi-crystalline polymer is aramid.

14. The optical disk of claim 13, wherein aramid contains phthalic acid chloride and metaphenylene diamine.

15. An optical disk comprising an outer circumferential area on which a recording film for recording and reproducing data is formed, and an inner circumferential area which is formed inside the outer circumferential area and which the recording film is not formed on,
    wherein the outer circumferential area is composed of polycarbonate, and the inner circumferential area is composed of polyamide.

* * * * *